J. H. HAMMOND, Jr.
SYSTEM OF TELEDYNAMIC CONTROL FOR DIRIGIBLE BODIES.
APPLICATION FILED DEC. 20, 1915. RENEWED MAR. 12, 1919.
1,418,793.
Patented June 6, 1922.
8 SHEETS—SHEET 1.
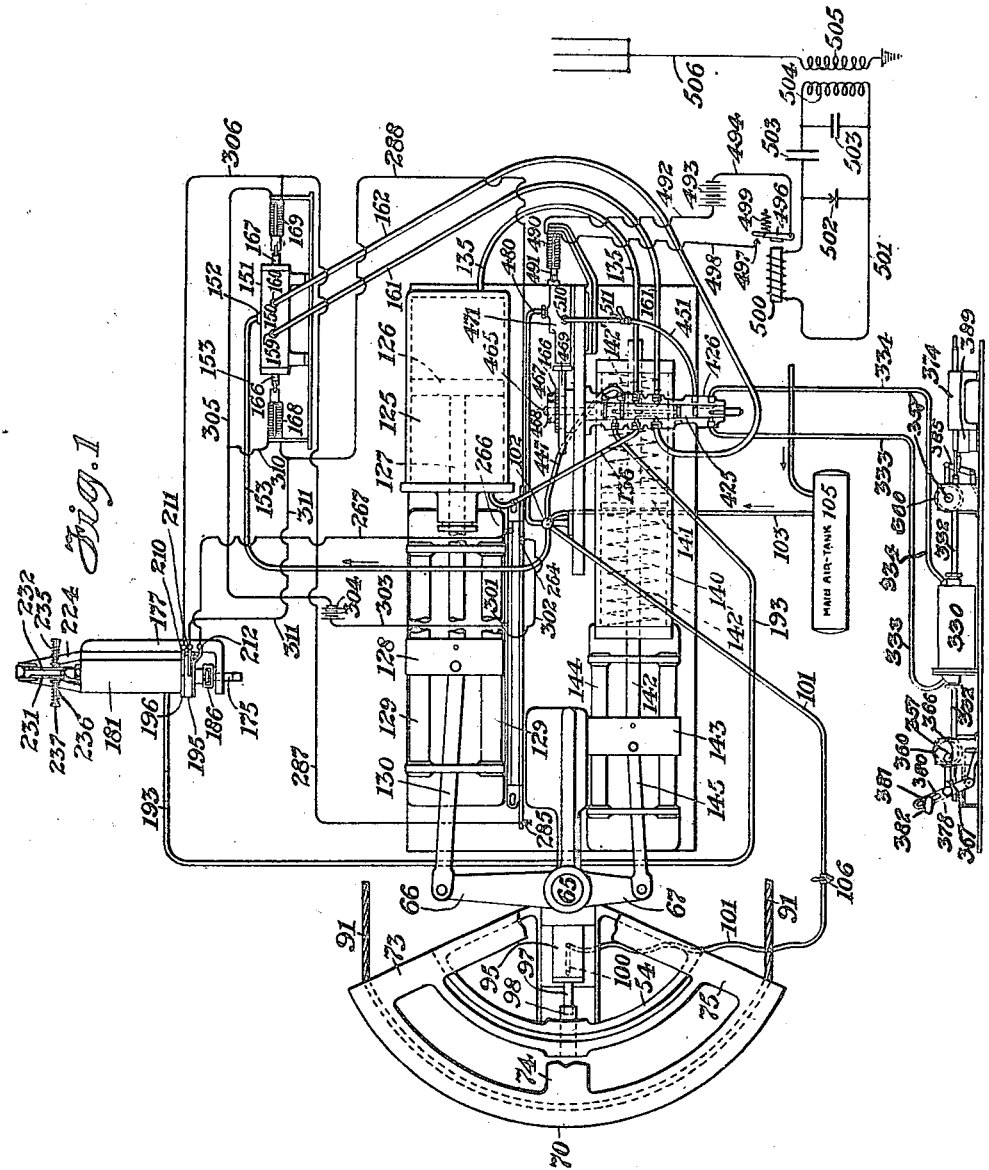

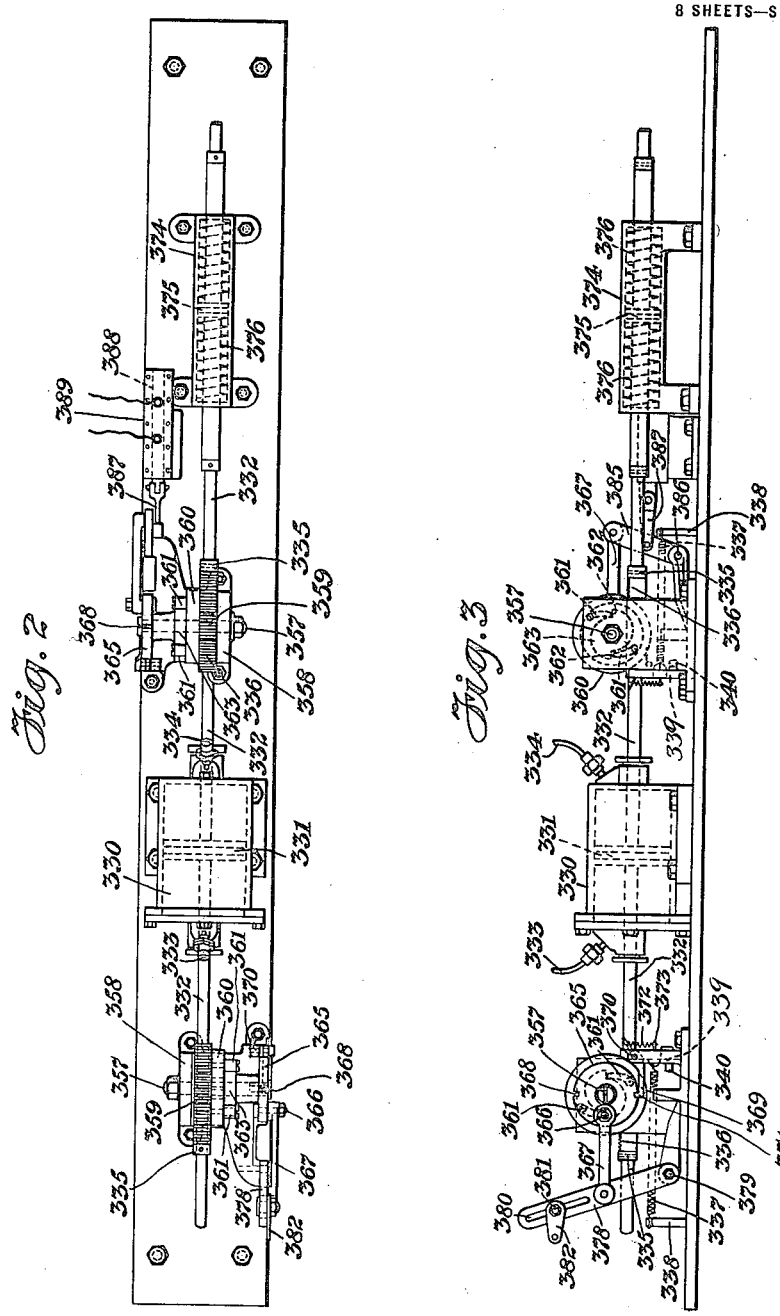

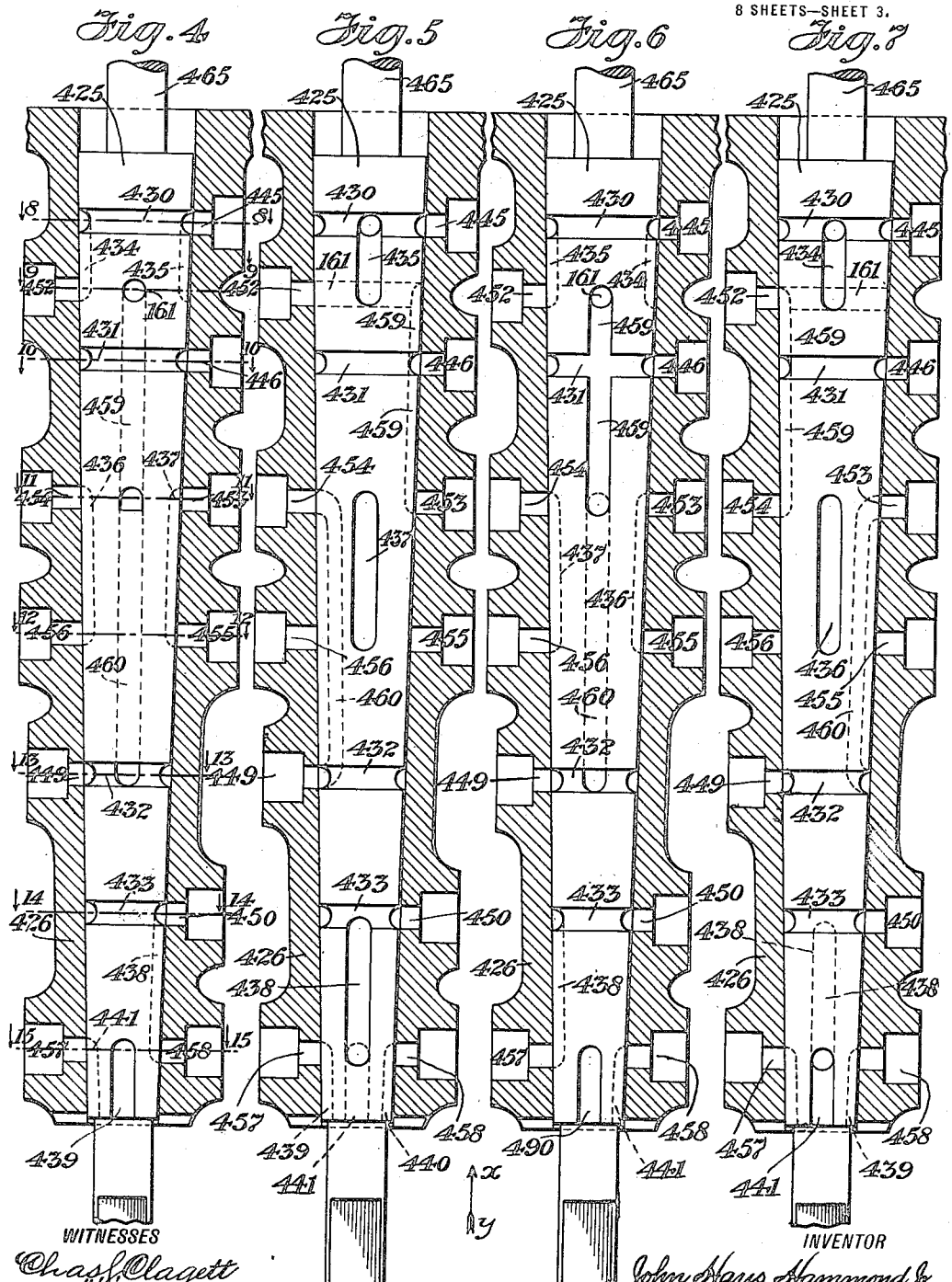

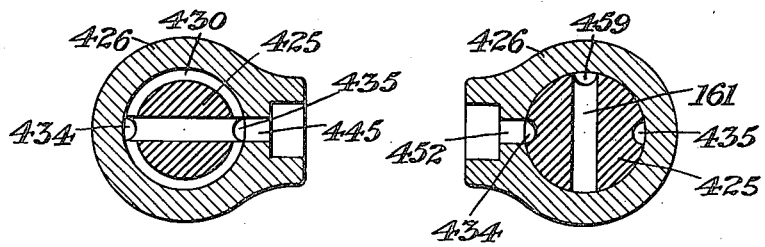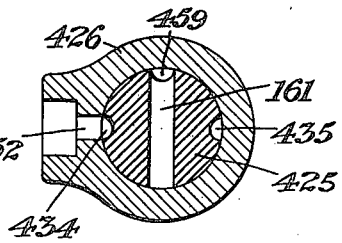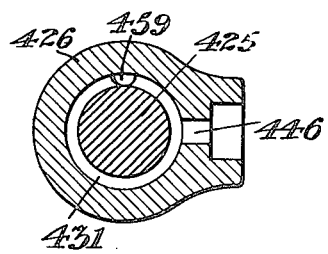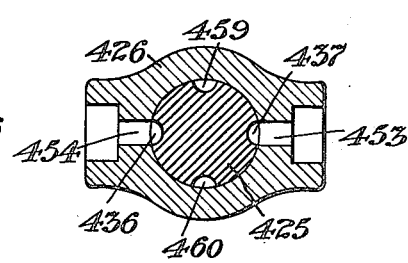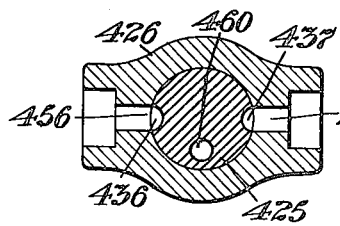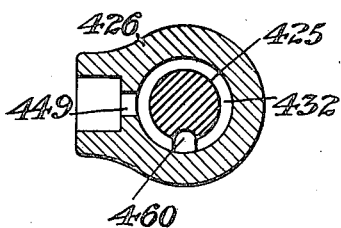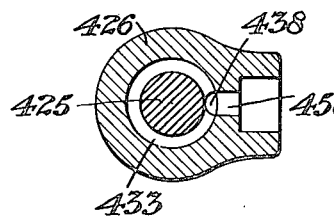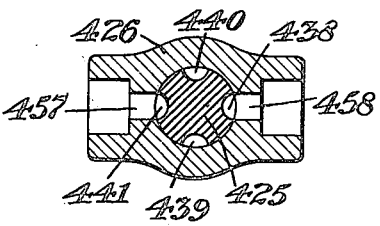

J. H. HAMMOND, Jr.
SYSTEM OF TELEDYNAMIC CONTROL FOR DIRIGIBLE BODIES.
APPLICATION FILED DEC. 20, 1915. RENEWED MAR. 12, 1919.

1,418,793.

Patented June 6, 1922.
8 SHEETS—SHEET 5.

WITNESSES
Chas F Clagett
Albert D Trevor

INVENTOR
John Hays Hammond Jr.
BY A. J. Gardner
HIS ATTORNEY

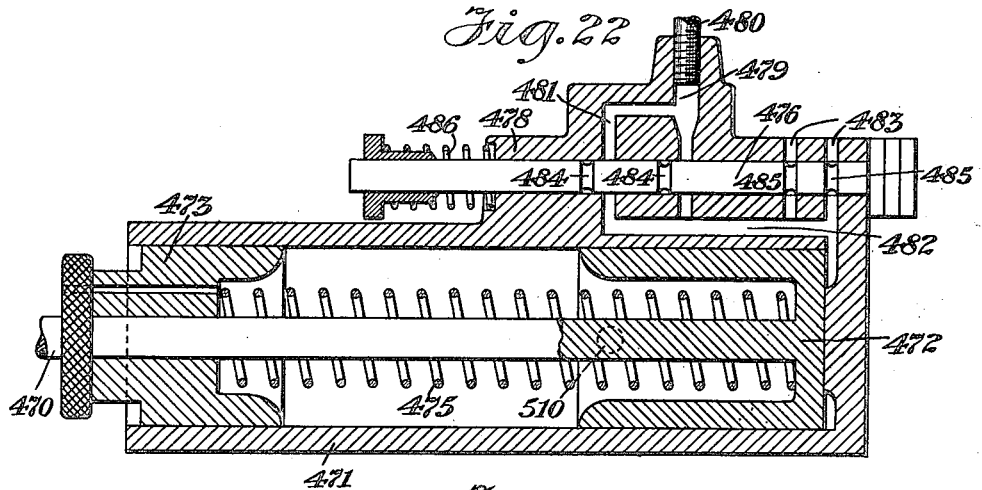
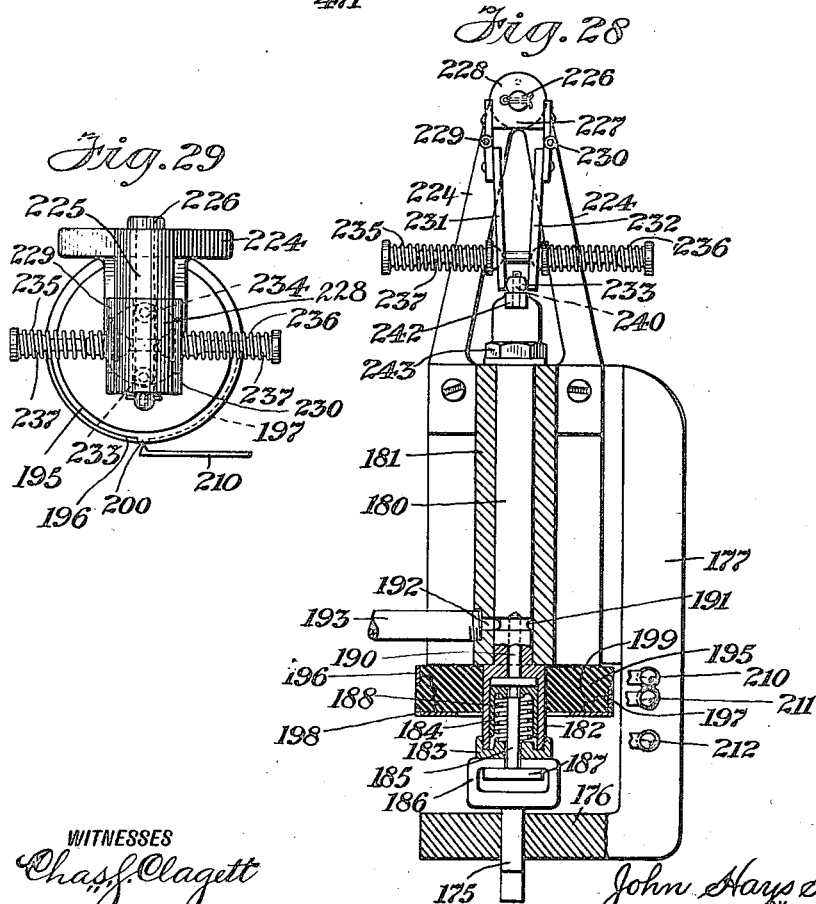

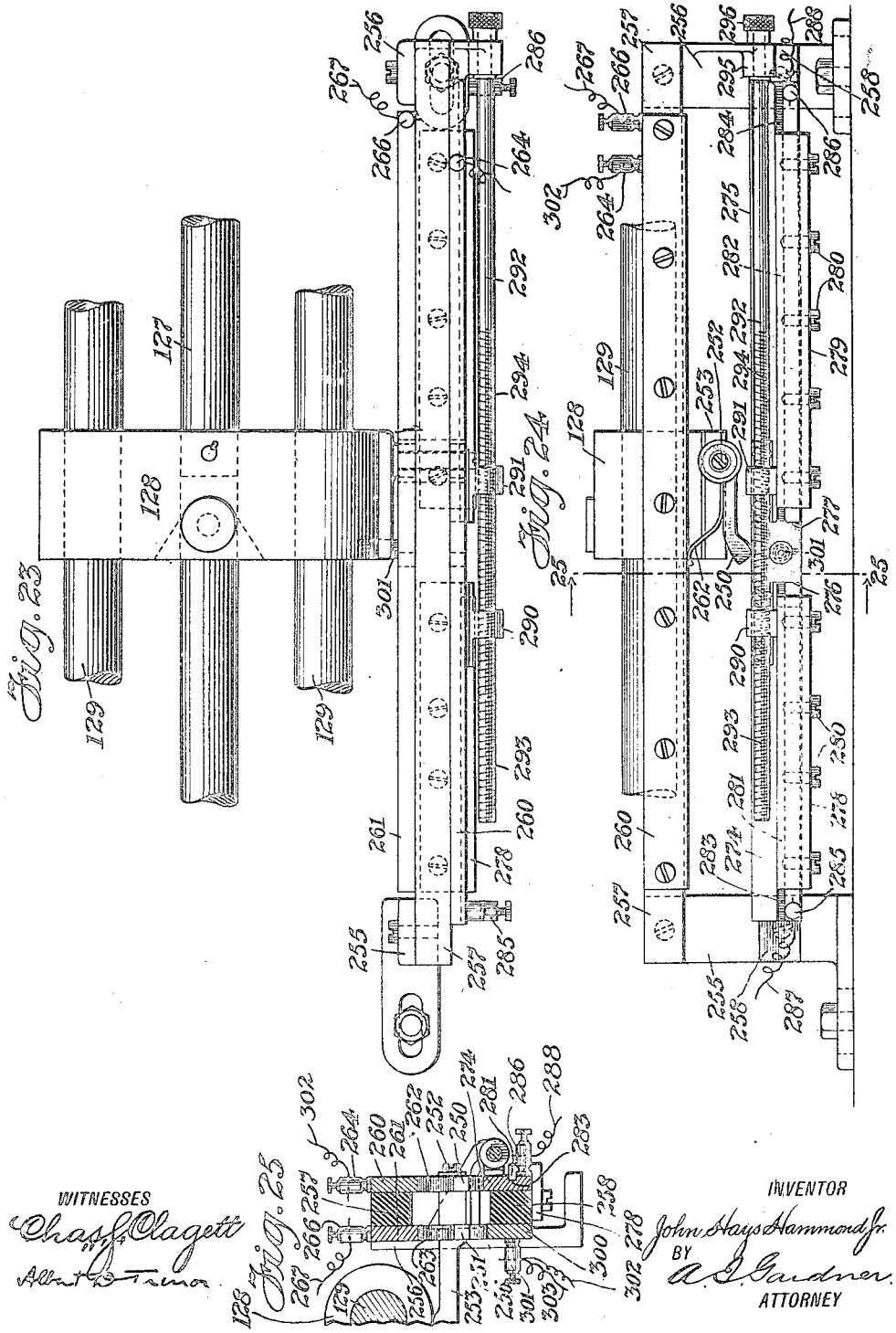

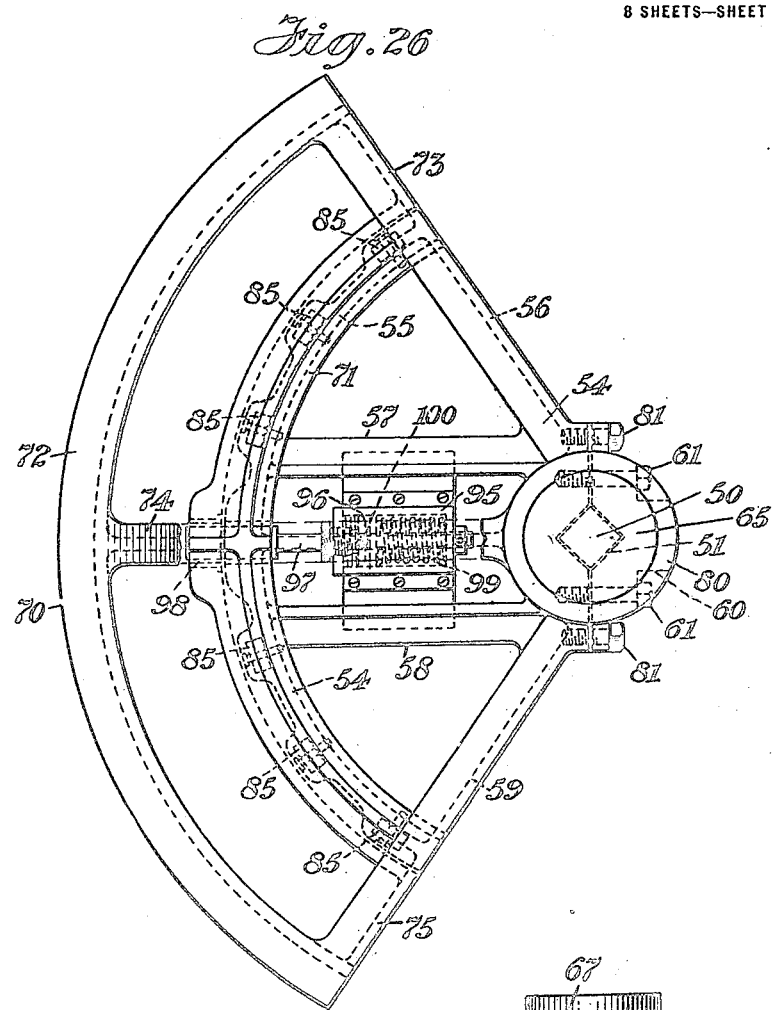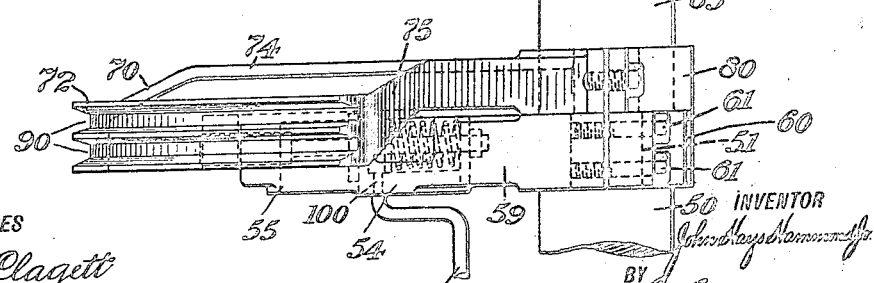

UNITED STATES PATENT OFFICE.

JOHN HAYS HAMMOND, JR., OF GLOUCESTER, MASSACHUSETTS.

SYSTEM OF TELEDYNAMIC CONTROL FOR DIRIGIBLE BODIES.

1,418,793.　　　　　　Specification of Letters Patent.　　Patented June 6, 1922.

Application filed December 20, 1915, Serial No. 67,947. Renewed March 12, 1919. Serial No. 282,189.

*To all whom it may concern:*

Be it known that I, JOHN HAYS HAMMOND, Jr., a citizen of the United States, and a resident of the city of Gloucester, county of Essex, and State of Massachusetts, have invented a certain new and useful System of Teledynamic Control for Dirigible Bodies, of which the following is a specification.

One of the objects of this invention is to provide improved means whereby a dirigible body, for instance, a marine vessel, an air craft or any other dirigible device may be selectively steered in any desired direction by a distant operator, and whereby when not so steered the dirigible will be automatically steered or maintained upon a predetermined fixed path or course by means carried by the dirigible.

A further object of this invention is to provide improved means for controlling from a distance not only the direction of movement of a dirigible but also the operation of various devices located upon the dirigible and arranged to perform a variety of functions.

Further objects of this invention will appear hereinafter.

Figure 16:
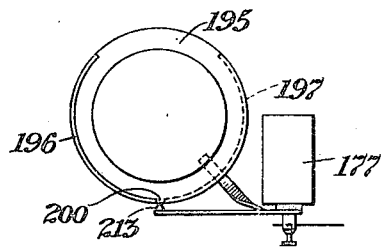
Figure 17:
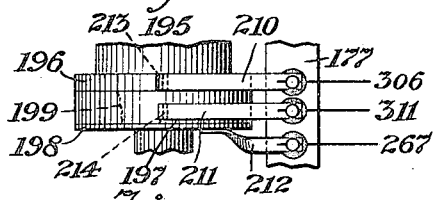
Figure 18:
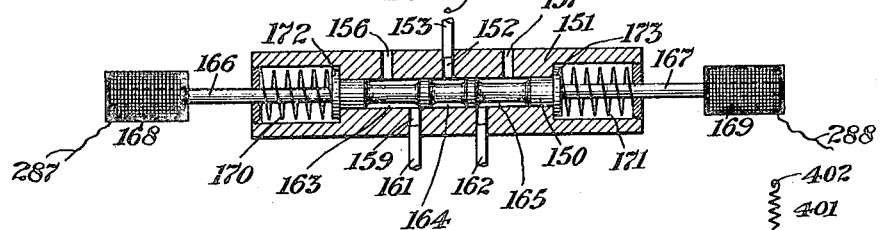
Figure 19:
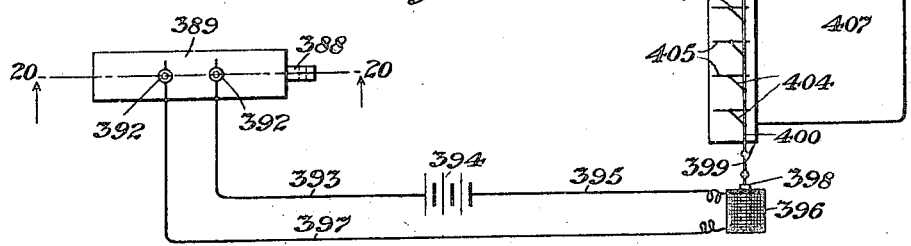
Figure 20:
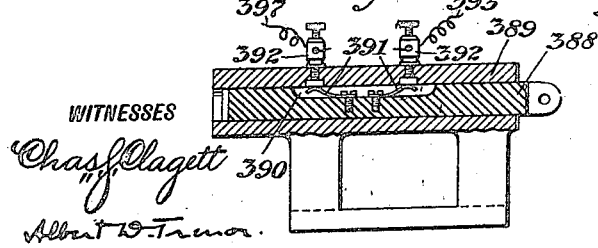
Figure 21:
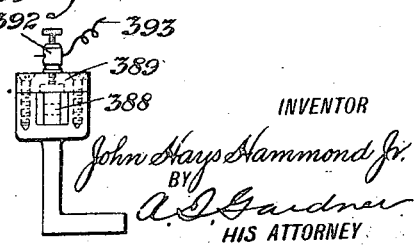

In the accompanying drawings, Fig. 1 is a diagrammatic fragmentary plan view of a system of control, constructed in accordance with this invention; Figs. 2 and 3 are a top plan view and a side elevation respectively of a portion of the same, including means for effecting the control of the motive power of the dirigible, and for effecting the control of a searchlight or other device upon the dirigible; Figs. 4, 5, 6 and 7 are enlarged longitudinal central sections taken through the valve casing of a main controlling valve, forming a part of this invention, showing the valve in its four positions of operation respectively; Figs. 8 to 15 are transverse sections through the valve casing and valve taken on lines 8—8 to 15—15 respectively of Fig. 4; Figs. 16 and 17 are an enlarged top plan view and a fragmentary side elevation respectively of a commutator and cooperating parts forming a portion of this invention; Fig. 18 is an enlarged longitudinal section of a piston valve forming a part of this invention; Fig. 19 is an enlarged diagrammatic plan view of means for controlling the searchlight; Figs. 20 and 21 are an enlarged fragmentary longitudinal section and an end elevation respectively of a switch forming a part of this invention, Fig. 20 being taken on line 20—20 of Fig. 19; Fig. 22 is an enlarged longitudinal central section of a fluid motor forming a part of this invention; Figs. 23 and 24 are an enlarged fragmentary top plan view and a front elevation respectively of a portion of this invention, comprising cooperating parts arranged to limit the helm angle of a rudder; Fig. 25 is a transverse section on line 25—25 of Fig. 24; Figs. 26 and 27 are a fragmentary top plan view and a side elevation respectively of a portion of this invention comprising cooperating parts arranged to control the rudder; Fig. 28 is an enlarged longitudinal section of a portion of this invention, comprising parts arranged to cooperate with a gyroscope in automatically maintaining the dirigible upon a predetermined course; and Fig. 29 a fragmentary top plan view of parts shown in Fig. 28.

Referring to the drawings, one embodiment of this invention comprises a system for the control of a dirigible, for instance, a marine vessel (not shown), and includes a rudder (not shown), which is rigidly connected to an approximately upright rudder shaft 50 which is arranged to rotate about its longitudinal axis which is fixed with respect to the vessel. For rotating the rudder about its longitudinal axis either automatically or at the will of an operator located either at a distance or upon the vessel, the upper portion of the rudder post is preferably squared as at 51 and to this squared portion is rigidly clamped a segmental frame 54 comprising an arcuate portion 55 and arms 56, 57, 58 and 59 by means of a yoke 60 and screws 61 extending through the yoke and threaded into the segmental frame 54. Resting upon the segmental frame 54 and fitting snugly over the upper squared end 51 of the rudder shaft, and held against rotation with respect thereto, is a short cylindrical shaft 65, and spaced above the segmental frame 54 and rigidly secured to the short shaft 65 are a pair of oppositely disposed arms 66 and 67 whereby the rudder may be automatically oscillated about its axis, as will appear hereinafter. Between the segmental frame 54 and the arms 66 and 67, is an upper segmental frame 70, comprising two arcuate portions 71 and 72 coaxial with the rudder shaft 50 and connected by radial arms 73, 74 and 75. This upper segmental frame 70 is clamped loosely around the short shaft 65 by means of a yoke 80 and screws 81 which extend through the yoke and are threaded into the upper frame 70, the upper frame 70 being thus mounted to rotate about and with respect to the short shaft 65 and the rudder shaft 50. For supporting the upper frame 70 and permitting its free rotation, a plurality of roller bearings 85 are arranged between the arcuate portion 71 of the upper frame and the arcuate portion 55 of the lower frame, thus supporting the upper frame on anti-friction bearings carried by the lower frame. The arcuate portion 72 of the upper frame is provided with grooves 90 in which is arranged a tiller rope 91 whereby the rudder may be oscillated at the will of an operator upon the vessel, as will appear hereinafter.

For automatically connecting and disconnecting the lower segmental frame 54 to the upper segmental frame 70, a cylinder 95 is arranged between and rigidly secured to the arms 57 and 58 of the lower frame 54, and is provided with a piston 96 arranged to reciprocate therein, and having an outwardly extending piston rod 97 secured thereto and which is arranged, when in its outermost position, to engage in an aperture 98 provided therefor in the arcuate portion 71 of the upper frame 70. This piston is pressed outwardly and held in its outermost position to lock the two frames 54 and 70 together, by means of a spiral spring 99 arranged in the cylinder 95. For forcing the piston 96 inwardly to release the upper frame 70 from the lower frame 54, the outer portion of the cylinder 95 is connected through a passage 100, pipe 101, fixed pipe union 102, and pipe 103 with a main air tank 105 or other source of fluid under pressure. The pipe 101 is controlled by a three way rotatably adjustable valve 106 of any suitable construction, which may be adjusted either to connect the cylinder 95 to the source 105 of air supply or to close the portion of the pipe 101 leading from the valve to the union 102, and to open to the surrounding air the portion of the pipe 101 leading from the cylinder 95 to the valve 106 to permit the air to exhaust from the cylinder 95 and the spring 99 to force the piston 96 outwardly to lock the lower frame 54 to the upper frame 70.

For oscillating the rudder in response to fluid pressure, a steering cylinder 125 is fixedly mounted upon the vessel, and is provided with a piston 126 arranged to reciprocate therein, which is secured to the inner end of a piston rod 127, the outer end of which is secured to a crosshead 128 which is arranged to reciprocate in a predetermined path upon guides 129. Pivotally connected to the crosshead 128 is one end of a connecting rod 130, the other end of which is pivotally connected to the outer end of the arm 66 controlling the rudder. Compressed air or other fluid is supplied to and exhausted from the opposite ends of the cylinder 125 by means of two pipes 135 and 136, through which the flow of fluid is controlled, as will appear hereinafter.

For normally holding the rudder in a central position, and for automatically returning the rudder to a central position after it has been diverted therefrom, any suitable means may be provided, but in the form of the invention shown, means are provided comprising a centering cylinder 140 held in fixed relation and substantially parallel to the steering cylinder 125. Arranged to reciprocate in the centering cylinder 140 is a piston 141 which surrounds and is rigidly secured to a piston rod 142 which is surrounded by two spiral springs 142', and which extends through the opposite ends of the cylinder. Connected to the outer end of the piston rod 142 is a crosshead 143 arranged to reciprocate in a fixed path upon guides 144. Pivotally secured to the crosshead 143 is one end of a connecting rod 145, the other end of which is pivotally secured to the free end of the arm 67, which is rigidly connected to the rudder.

For automatically maintaining the vessel upon a fixed predetermined course by automatically controlling the distribution of compressed air into and from the opposite ends of the steering cylinder 125, means are provided including a reciprocatory cylindrical valve 150 which is arranged to reciprocate in a fixed valve casting 151 which is provided centrally with an inlet port 152, which communicates through a pipe 153, pipe union 102 and pipe 103, with the tank 105 of compressed air. The valve casing 151 is also provided with two exhaust ports 156 and 157, arranged upon opposite sides respectively and equi-spaced from the inlet port 152, and the valve casing 151 is also provided with two delivery ports 159 and 160 which communicate through pipes 161 and 162 and suitable selective controlling means, as will appear hereinafter, and through the pipes 135 and 136, with the opposite ends of the steering cylinder 125. The cylindrical valve 150 is provided with three annular recesses 163, 164 and 165 forming annular passageways for the compressed fluid.

For moving the valve 150 longitudinally in either direction, the opposite ends of the valve are extended in the form of valve stems 166 and 167, which are arranged to reciprocate in and to form the cores of two fixed solenoids 168 and 169. The valve 150 is normally held in a central position by means of opposed spiral springs 170 and 171, surrounding the valve stems 166 and 167, and pressing against washers 172 and 173 which are loose on the stems 166 and 167 respectively. The construction of the valve 150 and its casing 151 is such that when the valve is in its central position, no fluid is allowed to flow from the pipe 153 through the valve casing, and the delivery pipes 161 and 162 are permitted to communicate with the exhaust ports 156 and 157, but when the valve is moved either to the left or to the right a sufficient distance from central position, the fluid will be allowed to flow from the inlet pipe 153 either into the delivery pipe 161 or into the delivery pipe 162, as the case may be, and the other delivery pipe 161 or 162 will remain in communication with the corresponding exhaust port 156 or 157.

For automatically energizing either the solenoid 168 or the solenoid 169 for automatically steering the vessel, means are provided including a gyroscope or other suitable direction maintaining means carried by the vessel and by which an upright gyroscopic stem 175 is held against rotation about its longitudinal axis in a well known manner, the stem 175 in the present case being arranged to rotate in a suitable fixed bearing 176 carried by a bracket 177. Arranged above and coaxial with the stem 175, is a spindle 180, which is arranged to rotate in a bearing 181, to which the bracket 177 is rigidly secured, and which is fixed with respect to the vessel. The lower portion of the spindle is enlarged to provide a hollow cylinder 182, over the lower end of which is threaded a cap 183, and in the cylinder a piston 184 is arranged to reciprocate and is provided with a rod 185 extending downwardly loosely through the cap 183 and through a yoke 186 which is rigid with the upper end of the stem 175. Within the yoke 186 is arranged a disc 187 which is rigidly secured to the lower end of the rod 185 and which is normally pressed upwardly against the under surface of the yoke 186 by a spiral spring 188 arranged between the cap 183 and the piston 184, and normally pressing the piston upwardly, thus normally securely clamping the gyroscopic stem 175 to the spindle 180. For releasing the spindle 180 from the gyroscopic stem 175, the upper end of the cylinder 182 communicates through an aperture 190, annular recess 191 and port 192, with a pipe 193 which is connected through suitable controlling means with the source of air supply 105, as will appear hereinafter. Fixedly secured upon the cylindrical lower portion of the spindle 180, is a commutator 195, which is provided with two oppositely disposed segmental contacts 196 and 197, and with a flat annular contact 198. These three contacts are electrically connected by a wire 199 extending through the commutator, or in any other suitable manner, and the segmental contacts 196 and 197 are so arranged that their adjacent ends are slightly spaced apart in vertical projection by a narrow insulation 200. Arranged to engage the three contacts 196, 197 and 198, are three resilient brushes 210, 211 and 212, which are carried by and insulated from the fixed bracket 177. Two of these brushes are substantially parallel and horizontal, and are provided at the free ends with comparatively narrow contacts 213 and 214, which are arranged in vertical alinement, which when the commutator 195 is in its initial position makes contact only with insulation 200 between the two segmental contacts 196 and 197. The third brush 212 is continuously in engagement with the flat annular contact 198.

For yieldingly holding the commutator 195 in its initial inoperative position (shown in Figs. 1, 16 and 17), and for returning the commutator from an operative position into its initial inoperative position upon being released from the gyroscopic stem 175, a yoke 224 is rigidly secured to and extends upwardly from the bearing 181 and has at its upper end, an extension 225 rigid therewith, through which projects a substantially horizontal bolt 226 which has a portion 227 extending diametrically over the spindle 180, and upon which is rotatably mounted a sleeve 228, depending from which and pivotally connected thereto as at 229 and 230 to swing with respect thereto about parallel substantially horizontal axes are two plates 231 and 232. The lower ends of these plates 231 and 232 are pressed inwardly against the opposite sides of two horizontally spaced rollers 233 and 234 by means of two opposed spiral springs 235 and 236 which surround a rod 237 which extends loosely through the two plates 231 and 232. The rollers 233 and 234 are arranged to rotate about vertical axes upon two pins 240 and 241 which project upwardly from and are rigid with a horizontal bar 242 which is rigid with a nut 243 which is threaded upon and rigidly secured to the upper end of the spindle 180 and held in fixed relation thereto.

For automatically limiting the helm angle or the angle of oscillation of the rudder of the vessel, any suitable means may be provided for automatically making and breaking the circuits controlled by the commutator 195 in response to the movement of the rudder. In the form of this invention shown, there is provided for this purpose (as shown in Fig. 1 and as shown in enlarged detail in Figs. 23, 24 and 25), helm limiting means including a pair of horizontally spaced brushes 250 and 251, which are pivotally mounted upon and insulated from a substantially horizontal stud 252 which projects outwardly from and is rigid with a plate 253 which is rigidly secured to the under side of the cross head 128, the brushes 250 and 251 being insulated from each other and from the plate 253. For cooperating with the brushes 250 and 251, there is provided an upright frame comprising two fixed standards 255 and 256 which are rigidly connected by two substantially parallel and horizontal bars 257 and 258, preferably made of insulating material and arranged substantially in the same vertical plane. Secured to the opposite sides of the upper one 257 of these bars are a pair of horizontally elongated conducting plates 260 and 261 which are arranged vertically above the two brushes 250 and 251 respectively. Secured to the two brushes 250 and 251 respectively are two springs 262 and 263 made of conducting material, and arranged to engage the under straight edges of the two conducting plates 260 and 261 respectively, and tending at all times to press the free ends of the two brushes downwardly about the stud 252. The upper front conducting plate 260 is provided with a terminal post 264, and the back conducting plate 261 is provided with a terminal post 266 from which a return conductor 267 leads to the lowermost brush 212. Slidably resting against the front or outer side of the lower insulation bar 258 are two horizontal longitudinally alined conducting plates 274 and 275, the inner ends 276 and 277 of which are normally spaced a slight distance apart. These conducting plates are slidably held in place by means of two supporting plates 278 and 279 which are rigidly secured to the under side of the lower insulation bar 258 by means of screws 280, and the outer longitudinal edges of these plates are turned upwardly and then inwardly providing two substantially horizontal alined tongues 281 and 282 which engage loosely in grooves 283 and 284 provided therefor in the front surfaces of the conducting plates 274 and 275 and extending longitudinally thereof. These adjustable conducting plates 274 and 275 are provided respectively with two terminal posts 285 and 286 from which extend respectively two conductors 287 and 288 which connect these two posts respectively to solenoids 169 and 168.

For adjusting the conducting plates 274 and 275 longitudinally towards or away from each other to vary the space between the inner ends 276 and 277 of the conducting plates 274 and 275, and to consequently vary the angle through which the rudder is permitted to swing while it is under the control of the gyroscope, two horizontally alined nuts 290 and 291 are rigidly secured to but insulated from the two conducting plates 274 and 275, and an adjusting screw 292 extends through the nuts 290 and 291. This adjusting screw 292 is provided with a right hand thread 293 which extends from the outer end of the screw to a point substantially midway between the ends 276 and 277 of the conducting plates 274 and 275, and from the latter point leading inwardly the adjusting screw is provided with a left hand thread 294, the right hand thread 293 being arranged to cooperate with the nut 290, and the left hand thread 294 being arranged to cooperate with the other nut 291. This adjusting screw is extended toward the right (as seen in Figs. 23 and 24), and the right hand end of this screw is reduced in diameter and extends snugly but rotatably through a bearing 295 which is fixed upon the upright frame 256, and beyond the bearing 295 a knurled head 296 is rigidly secured to the reduced portion of the adjusting screw. By this construction, the adjusting screw 292 is held against longitudinal movement in either direction, but may be freely rotated in either direction by means of the knurled head 281 to move the conducting plates 274 and 275 either towards or away from each other to vary the limits of the helm angle, as will appear hereinafter.

Rigidly secured to the rear face of the lower insulation bar 258, is an elongated substantially horizontal conducting plate 300, the upper edge of which is substantially straight and horizontal and arranged to be in a horizontal plane slightly below the horizontal plane of the upper edges of the front conducting plates 274 and 275, so as to be engaged by the free end of the inner brush 251 when the free end of the outer brush 250 is allowed to fall between the inner ends of the two front plates 274 and 275. The arrangement is such that when the crosshead 128 is moved in either direction from its central position (shown in Figs. 23 and 24) and the free end of the outer brush 250 is brought into contact with and lifted by either one of the front plates 274 and 275, the free end of the inner brush 251 will be lifted out of engagement with the upper edge of the lower back plate 300, the two brushes being rigidly connected together. The lower back plate 300 is provided with a terminal post 301 which is connected by a conductor 302 with the terminal post 264 of the upper front conducting plate 260, and is also connected by a conductor 303 with one pole of a battery 304 or other source of electrical energy, the other pole of which is connected by a conductor 305 with one end of the right hand solenoid 169, the other end of which is connected by conductor 306 with the uppermost brush 210 of the commutator. A branch conductor 310 connects the conductor 305 from the battery to one end of the left hand solenoid 168, the other end of which is connected by a conductor 311 with the intermediate brush 211 of the commutator.

For controlling the motive power of the dirigible body, and for controlling a searchlight or other device carried by the dirigible, a cylinder 330 is fixedly secured upon the dirigible and is provided with a piston 331 arranged to reciprocate therein, and which is fixedly secured to a reciprocatory piston rod 332 which projects for a considerable distance in each direction from the cylinder 330. The opposite ends of the cylinder are closed; and provided with two pipes 333 and 334 communicating therewith respectively, and through which compressed air or other fluid is admitted and exhausted from the opposite ends of the cylinder, as will appear hereinafter. Fixedly secured to the piston rod 332 and spaced upon opposite sides of the cylinder 330 are two collars 335, and slidably surrounding the piston rod 332 between each collar 335 and the cylinder 330 is a rack 336 which is normally pressed outwardly against its collar 335 by means of a spiral spring 337, one end of which is secured to a fixed stud 338 and the other end of which is secured to a lug 339 which projects downwardly from and is rigidly secured to the inner end of the rack and which is arranged to be limited in its outward movement by a fixed stop 340. Extending transversely over and spaced above each rack 336 is a shaft 357 one end of which is rigidly supported in a fixed bracket 358, and the other end of which projects freely from the bracket. Loosely mounted upon each shaft 357 and engaging the corresponding rack 336 is a pinion 359, and loosely surrounding each shaft 357 and rigidly secured to the corresponding pinion 359 is a disc 360 upon the outer surface of which are pivotally mounted two pawls 361 which are arranged to engage in unison two teeth 362 provided therefor on a ratchet 363 which loosely surrounds the outer portion of the shaft 357. Rigidly secured to each ratchet 363 is a crank disc 365 loosely surrounding the shaft 357 and provided with a crank pin 366 rigid therewith, which engages loosely in one end of a connecting rod 367.

For yieldingly holding each crank disc 365 in a fixed position at each half revolution, each crank disc is provided with two diametrically opposite V shaped recesses 368, and adjacent each crank disc a detent 369 is pivoted as at 370 to oscillate about a fixed axis and is provided at its free end with a V shaped tooth 371 which is arranged to engage consecutively in the corresponding recesses 368, and is yieldingly pressed into engagement therewith by a spiral spring 372 one end of which is connected to the detent and the other end of which is secured to a fixed stud 373.

For yieldingly holding the piston 331 in a central position, and for returning the piston to a central position after having been displaced therefrom, one end of the piston rod 332 extends slidably through a fixed cylinder 374, within which a piston 375 is rigidly secured to the piston rod 332 and is normally held centrally within the cylinder 374 by means of opposed spiral springs 376 surrounding the piston rod upon opposite sides of the piston 375.

For controlling the means for propelling the vessel or dirigible the outer end of one of the connecting rods 367 (see Figs. 1, 2 and 3) is pivotally connected to a lever 378 which is arranged to oscillate about a fixed pivot 379 extending through one end of the lever, and the free end of the lever is provided with an oblong slot 380 through which loosely extends a bolt 381 whereby a connector 382 is adjustably clamped to the lever 378. The connector 382 is connected in any well known or suitable manner to control the speed or to start or stop the engine or motor which propels the dirigible body.

For controlling a searchlight or other device on the dirigible body, the outer end of the other connecting rod 367 is pivotally connected to one end of a lever 385 which is arranged to oscillate about a fixed pivot 386 extending through the other end of the lever. Pivotally connected to the lever 385 is one end of a connecting rod 387, the other end of which is pivotally connected to a bar 388 which is arranged to reciprocate in a fixed bearing 389, and within the bearing 389 (Fig. 20) and secured to the bar 388 within a recess 390 provided therefor in the bar are two yielding contacts 391 which are arranged to engage and electrically connect two terminal posts 392 carried by and insulated from the bearing 389. One of these posts 392 is connected by a conductor 393 with one pole of a battery 394, the other pole of which is connected by a conductor 395 to one end of a solenoid 396 the other end of which is connected by conductor 397 to the other terminal post 392. The solenoid 396 controls a reciprocatory core 398 which is connected by a link 399 to one end of a rod 400, the other end of which is connected to one end of a spiral spring 401 the other end of which is connected to a fixed stud 402 whereby the rod 400 and core 398 are yieldingly held in a predetermined position. The rod 400 is pivotally connected to the outer ends of arms 404 which are rigid with shutters 405 which are arranged to oscillate about fixed pivots 406 to open and close a stationary searchlight 407. The construction is such that when the solenoid 396 is energized as a result of the electrical connection of the posts 392 by the brushes 391, the core 398 will be drawn into the solenoid 396 against the action of the spring 401 and will open the shutters 405, thus opening the searchlight 407.

For controlling all of the hereinbefore described devices, a main rotary fluid distributing valve 425, which may be slightly tapered or conical in shape, is arranged to rotate in a corresponding valve casing 426 fixed upon the dirigible. This valve 425

(see Figs. 4 to 15) is provided with four annular recesses 430, 431, 432 and 433, which for convenient future reference may be called the first, second, third and fourth annular recesses respectively. The valve 425 is also provided with a plurality of longitudinal recesses including two diametrically opposed recesses 434 and 435 leading from the first annular recess 430 inwardly and terminating between the first and second annular recesses; two diametrically opposed longitudinal recesses 436 and 437 which are placed between the second annular recess 431 and the third annular recess 432; a longitudinal recess 438 leading from the fourth annular recess 433 toward the smaller end of the valve; and two diametrically opposed longitudinal exhaust recesses 439 and 440, and an intermediate longitudinal passage 441, having their inner ends arranged in a common plane and opening at their lower ends through the lower end of the valve into the surrounding atmosphere. The valve casing is provided with an exhaust port 445 through which the first annular recess 430 communicates at all times with the surrounding air. The valve casing is also provided with a port 446 through which the second annular recess 431 communicates at all times through a pipe 447, pipe union 102 and pipe 103 with the air tank 105. The third annular recess 432 communicates at all times with the surrounding air through an exhaust port 449 provided therefor in the valve casing, and the fourth annular recess 433 communicates at all times through a port 450 provided therefor in the valve casing with a pipe 451. The valve casing 426 is also provided with a port 452, which communicates at all times with the pipe 193 leading to the clutch between the gyroscopic stem and the commutator 195. The valve casing is also provided with two pairs of diametrically opposed ports 453, 454 and 455, 456, which are arranged to simultaneously connect the pipe 136 with the pipe 162 and the pipe 135 with the pipe 161 at every half revolution of the valve from a given position. The valve casing is also provided with two oppositely disposed ports 457 and 458 which communicate at all times respectively with the pipes 333 and 334. The valve 425 is also provided with a longitudinal recess 459 intersecting the second annular recess 431, and with a longitudinal passage 460 extending beneath the surface of the valve and leading from the third annular passage 432 towards the second annular passage 431, and opening at a point arranged to communicate successively with the ports 453 and 454. The valve is also provided with a transverse aperture 161 arranged to connect the longitudinal recess 459 with the port 452 when the valve is in a given position.

For giving the valve 425 a rotary step by step movement through ninety degrees at each step and in a counter-clockwise direction as seen when looking in the direction of the arrow XY, the larger end of the valve is provided with a valve stem 465 rigid therewith, upon which is loosely mounted a pinion 466 which carries a pawl 467 pivotally connected thereto and arranged to engage a suitable ratchet 468 which is rigidly secured to the stem 465. A rack 469 engages the pinion 466 and forms one end of a reciprocatory piston rod 470 which is arranged to reciprocate in a stationary cylinder 471 and which has rigidly secured to its inner end a piston 472 (Fig. 22) arranged to reciprocate in the cylinder. The cylinder is provided at its outer end with a head 473, and the piston 472 is normally yieldingly held in its innermost position by a spiral spring 475 surrounding the piston rod 470 between the head 473 and the piston 472. For controlling the flow of compressed air to and from the space within the cylinder back of the piston 472, a piston valve 476 is arranged to reciprocate in a valve casing 478 which is provided with a main inlet passage 479 which communicates through a pipe 480, pipe coupling 102 and pipe 103 with the air tank 105. Two branch inlet passages 481 connect the main inlet passage 479 with a passage 482 which communicates with the inner end of the cylinder 471 and which also communicates with two exhaust ports 483. The valve 476 is provided with two annular recesses 484 to open and close the branch inlet passages 481 and with two annular recesses 485 arranged to open and close the exhaust ports 483. The valve 476 is normally held by a spiral spring 486 in such a position that the branch inlet passages 481 will be closed thereby, and the exhaust ports 483 will be left open to communicate with the cylinder 472.

The piston valve 476 for controlling the piston 472 which controls the main rotary valve 425 may be moved against the action of the spring 486 by any suitable means to open the inlet passages 481 and to close the exhaust ports 483. In the construction shown, means are provided for performing this function in response to radiant energy, and the means shown includes a solenoid 490 arranged in alinement with the valve 476 and provided with a core 491 arranged to reciprocate in the solenoid and rigidly connected to the valve 476. One end of the solenoid is connected by a wire 492 to one pole of a battery 493 or other source of electrical energy, the other pole of which is connected by a wire 494 with a switch 496 which is pivoted to swing into and out of engagement with a contact 497 which is connected by a wire 498 with the other end of the solenoid 490. The switch 496 is normally held out of engagement with the contact 497 by a spiral spring 499, and is arranged to be drawn into engagement with the contact 497 by a stationary electromagnet 500 which is arranged to be energized by a closed oscillatory circuit including a conductor 501, a detector 502, condensers 503 and an inductance coil 504 which is inductively connected to an inductance coil 505 which forms part of an open aerial circuit 506 arranged to respond to radiant energy.

By this construction, when an impulse or signal of radiant energy is received by the aerial circuit 506, the electromagnet 500 will be energized thus closing the circuit through the solenoid 490, and drawing its core 491 into the solenoid and thus moving the valve 476 to open the inlet passages 481 and to close the exhaust ports 483, whereupon the piston 472 will be moved outwardly and held there as long as the impulse of radiant energy persists, thus rotating the main controlling valve 425 through ninety degrees. When the piston 472 is moved outwardly over a predetermined position of its path, it uncovers a delivery port 510 extending through the wall of the cylinder through which communication is established between the inlet pipe 480 and the pipe 451 leading from the delivery port 510 through pipe 451 to the port 450 of the main valve casing. This pipe 451 is controlled by a rotatably adjustable valve 511, whereby the effective area of the pipe may be so adjusted as to retard the flow of air through the pipe to a sufficient degree. When the radiant impulse ceases, the valve 476 is permitted to return to its normal position under the action of the spring 486, thus permitting the piston 472 to be returned to its innermost position under the action of its spring 475 without moving the main controlling valve 425, and the delivery port 510 will then be closed by the piston, and the system will then be ready to respond to further radiant impulses to rotate the main controlling valve 425 successively through any number of steps in the same direction.

In the operation of the hereinbefore described system, the vessel is normally held on a fixed course by the action of the gyroscope. When it is desired to steer the vessel either to the right or to the left, the gyroscope is temporarily disconnected and the rudder is turned in the desired direction.

When the vessel is under the control of the gyroscope, the rotary valve 425 is in either one of the positions shown in Figs. 4 or 6, in which position the cylinder 182 which controls the clutch mechanism between the gyroscope and the commutator 195 is open to exhaust through the pipe 193, port 452, longitudinal recess 434 or 435, annular recess 430 and exhaust port 445 of the main valve casing, thus permitting the spiral spring 188 to press the piston 184 upwardly and thus clamp the gyroscopic stem 175 in a fixed relation to the commutator 195, which will then be held against rotation in space about its longitudinal axis by the stem 175. Also when the main controlling valve 425 is in either of these positions, the pipe 135 will be connected with the pipe 161 and the pipe 136 will be connected with the pipe 162 through the longitudinal passages 436 and 437 of the main valve 425, and the inlet of compressed air from the air tank 105 into the opposite ends of the steering cylinder 125, and the outlet of compressed air from the opposite ends of the steering cylinder will be controlled by the piston valve 150.

If now the vessel, while under the control of the gyroscope, should deviate from its predetermined course either to the right or to the left, the brushes 210, 211 and 212 would be correspondingly moved with respect to the commutator 195 and against the action of the centering springs 235 and 236, so as to cause the corresponding brush 210 or 211 to engage its corresponding segment 196 or 197, and the other one of these two brushes to remain out of engagement with its corresponding segment. If, for instance, the vessel should deviate to the right, the brush 210 would be brought into engagement with its segment 196, and a current would flow through the brush 210, wire 306, right hand solenoid 169, wire 305, battery 304, wire 303, terminal 301, lower back plate 300, back brush 251 and its spring 263, upper back plate 261, terminal 266 and wire 267, to the lowermost brush 212, and the wire 199 to the brush 210, thus completing the circuit through the battery 304 and energizing the right hand solenoid 169 to draw the piston valve 150 towards the right to admit compressed air into the pipe 162, leaving the pipe 161 open to exhaust port 156, thus forcing the piston 126 towards the right, and swinging the rudder in a clockwise direction, as viewed from above, to restore the vessel to its predetermined course. As the piston 126 moves toward the right, carrying the crosshead 128 therewith, the brushes 250 and 251 of the helm limiting mechanism (see Figs. 23 to 25), will be moved towards the right from a central position until the front brush 250 comes into engagement with the front right hand conducting plate 275, thus lifting the two brushes 250 and 251, the back brush 251 being thus lifted from the lower back plate 300, thus breaking the circuit through the back brush 251 and deenergizing the right hand solenoid 169, and at the same time the circuit is made from the battery 304, through wire 303, terminal 301, wire 302, terminal 264, upper front plate 260, spring 262, front brush 250, lower right hand front plate 275, terminal 286, wire 288, wire 311, left hand solenoid 168, wire 310, and wire 305 to the battery 304, thus completing the circuit through the battery 304 and the left hand solenoid 168, and drawing the piston valve 150 towards the left to admit air to the right hand end of the steering cylinder 125, forcing the piston 126 to the left until the brush 250 falls out of contact with the lower right hand contact plate 275, thus breaking the circuit through the left hand solenoid 168. Now, if the vessel is still off of its course towards the right, the circuit through the battery 304, brushes 210 and 212, and right hand solenoid 169 will be immediately reestablished, as hereinbefore described, and the cycle of operations just described will be repeated causing a vibration of the brush 250 through a very small distance into and out of contact with the inner end of the lower right hand conducting plate 275, and a consequent oscillation of the rudder through a correspondingly small angle, the mean position of which will be a few degrees to port (the mean position depending on the position of the edge 277 of the plate 275) until the vessel is restored to its predetermined course, whereupon both of the brushes 210 and 211 will be out of engagement with their segments, and no current will flow through either of the solenoids 168 and 169, and consequently the piston valve 150 will return to a central position under the action of its springs 170 and 171, thus opening both ends of the steering cylinder 125 to the exhaust ports 156 and 157 respectively, the rudder being returned to a central position by the springs 142' in the cylinder 140.

When, however, the vessel deviates from its predetermined course towards the left, the intermediate brush 211 will be brought into engagement with its contact 197, and a circuit will be completed through the brush 211, wire 311, left hand solenoid 168, conductors 310 and 305, through battery 304, conductor 303, terminal 301, lower back conducting plate 300, back brush 251, spring 263, upper back plate 261, terminal 266 and wire 267, lowermost brush 212 and wire 199 to the intermediate brush 211, thus energizing the left hand solenoid 168 to draw the valve 250 towards the left to admit compressed air from the inlet pipe 153 through the valve casing 151 and delivery pipe 161, and into the right hand end of the steering cylinder 125, as hereinbefore described, to force the piston 126 towards the left to restore the vessel to its predetermined course.

In this movement of the piston 126 towards the left, the crosshead 128 and brushes 250 and 251 will be carried from a central position towards the left until the brush 250 comes into engagement with the lower front conducting plate 274, whereupon the brushes will be lifted and the current through the rear brush 251 will be broken, as hereinbefore described, thus deenergizing the left hand solenoid 168, and at the same time completing the circuit through right hand solenoid 169, wire 305, battery 304, wire 303, terminal 301, wire 302, upper front conducting plate 260, spring 262, front brush 250, lower left hand front conducting plate 274, terminal 285, wire 287 to solenoid 169, thereby energizing the right hand solenoid 169 to open the right hand end of the steering cylinder 125 to the exhaust and to admit compressed air into the left hand end of the steering cylinder, as hereinbefore described, to move the piston toward the right until the front brush 250 has moved out of contact with the lower left hand front plate 274, whereupon, if the vessel is still off of its course towards the left, the cycle of operations just described will be repeated and there will be a slight vibration or fluctuation of the piston 126, moving the front brush 250 into and out of contact with the inner end 276 of the lower left hand front plate 274 until the vessel is restored to its course, whereupon the circuit through the battery 304 will be broken by the brushes 210 and 211, and both sides of the steering cylinder 125 will be left open to the exhaust ports 156 and 157 as hereinbefore described until the vessel again deviates slightly in either direction from its course, whereupon it will be again automatically restored to its course as just described.

When it is desired to steer the vessel selectively either to the right or to the left at the will of a distant operator, and in response to radiant energy, an impulse of radiant energy is sent from the controlling station which operates on the wireless receiving apparatus to energize the solenoid 500. This closes the circuit through the electromagnet 490, thus attracting its core 491 which draws the valve 476 to the right, thus allowing air to enter the cylinder 471. The piston rod 470 is therefore moved to the left and carries the rack 469 with it. The rack 469 rotates the pinion 466 which by means of the pawl 467 and ratchet 468 rotates the rotary valve 425, either into the position shown in Fig. 5, to steer the vessel to the right, or through 180 degrees from the position shown in Fig. 5 into the position shown in Fig. 7 to steer the vessel to the left. When the main valve 425 is in either of these positions, both ends of the cylinder 330 for controlling the propelling means of the vessel, and the searchlight, are open to exhaust through pipes 333 and 334, and exhaust recesses 439 and 440. Furthermore, when the valve is in either of these positions for selectively steering the vessel either to the right or to the left, the upper end of the vertical cylinder 182 for controlling the clutching means between the gyroscopic stem 175 and the commutator 195 is in communication with the main air tank 105, as will appear hereinafter, to render the gyroscope for the time being ineffective to control the vessel, and to permit the commutator 195 to be returned to a central or neutral position with respect to its brushes 210, 211 and 212.

When the main valve 425 is adjusted in the position shown in Fig. 5, to steer the vessel to the right, the right hand end of the steering cylinder 125 is connected to the main air tank 105, through the pipe 135, port 453, longitudinal passage 459 of the main valve, port 446, pipe 447, pipe union 102 and pipe 103; and the left hand end of the steering cylinder 125 is open to exhaust through the pipe 136, port 454, longitudinal passage 460 of the main valve and exhaust port 449. The steering piston 126 is thus forced to the left to steer the boat towards the right.

At the same time, the upper end of the cylinder 182 is connected to the main air tank 105 through the passage 190, annular passage 191, port 192, pipe 193, port 452, aperture 161 of the main valve, longitudinal passage 459, port 446, pipe 447, pipe union 102 and pipe 103, thus forcing the vertical piston 184 downwardly and holding it in its lowermost position, and thus disconnecting the gyroscopic stem 175 from the commutator 195, and rendering the gyroscope ineffective to control the movement of the vessel, the commutator being returned to a central position by the springs 235 and 236.

When the next impulse is sent to cause the dirigible body to be steered on a straight course under the action of the gyroscope, the rotary valve 425 is turned through 90 degrees into the position shown in Fig. 6. The air is then exhausted from the cylinder 182, as previously described, thus allowing the commutator 195 to be clutched to the gyroscopic stem 175. Before the gyroscope can take control, however, the rudder must be returned to a central position which is accomplished by the closing of the circuit through the battery 304, wire 303, wire 302, contact strip 260, spring 262, brush 250, conducting plate 274, wire 287, solenoid 169 and wire 305 to the battery 304. This energizes the solenoid 169 which draws the valve 150 to the right, thus allowing air to enter the left hand side of cylinder 125 which forces the piston 126 to the right, thus bringing the rudder back to the central position where the gyroscope takes control, as previously described. The springs 142′ expedite this return of the rudder to a central position.

When the valve is in the position shown in Fig. 7 for steering the boat towards the left, the left hand end of the steering cylinder 125 is connected to the main air tank 105, through the pipe 136, longitudinal passage 459, second annular passage 431, port 446, pipe 447, pipe union 102 and pipe 103; and the right hand end of the steering cylinder 125 is open to exhaust through the pipe 135, port 453, longitudinal passage 460, third annular recess 432, and exhaust port 449. The steering piston 126 is thus forced toward the right to steer the boat towards the left, and at the same time the upper end of the vertical cylinder 182 is connected to the main air tank 105 through the passage 190, annular passage 191, port 192, pipe 193, port 452, longitudinal recess 459, second annular recess 431, port 446, pipe 447, pipe union 102 and pipe 103, thus rendering the gyroscope for the time being ineffective to control the direction of the vessel.

When it is again desired to steer the boat on a straight course, an impulse is sent which turns the rotary valve 425 through 90 degrees into the position shown in Fig. 4, the operation being similar to that described for Fig. 6.

When it is desired to control the engine or other propelling means of the vessel, the main valve 425 is turned by a prolonged impulse of radiant energy into the position shown in Fig. 6, in which the left hand end of the cylinder 330 (see Figs. 2 and 3), is connected to the main air tank 105, through the pipe 333, port 457, longitudinal recess 438 of the main valve, annular recess 433, port 450, pipe 451, rear end of the cylinder 471 (see Fig. 22), passage 482, branch passages 481, passage 479, inlet pipe 480, pipe union 102 and pipe 103; and the right hand end of the cylinder 330 is open to exhaust through the pipe 334, port 458, and exhaust recess 441. The impulse of radiant energy which has caused the main valve 425 to be moved into this position is continued for a sufficient length of time to hold the piston 472 in the left hand end of the cylinder 471 to permit the air to flow through the delivery port 510, and pipe 451, and to cause the piston 331 (see Figs. 2 and 3), to be moved to the end of its path in a right hand direction, thus moving the left hand rack 336 towards the right but permitting the right hand rack 336 to remain stationary. This movement of the left hand rack 336 towards the right rotates the pinion 359 in a counter-clockwise direction, which by means of the pawls 361 and the ratchet 363 turns the corresponding crank disc 365 in a counter-clockwise direction, as viewed in Fig. 3, and through 180 degrees, thus swinging the lever 378 from a position at one end of its path towards the right, and into a position at the other end of its path, thus effecting the control of the engine. For instance, when the lever 378 is connected to operate the throttle of the engine, this motion of the lever towards the right may be caused either to increase the opening of the throttle to increase the speed of the engine, or to decrease the opening of the throttle and to decrease the speed of the engine. After the lever 378 has been thus moved to the right, it is held in its new extreme right hand position by the corresponding detent 371, and when the radiant impulse which has moved it into this position ceases, the piston 472 controlling the main valve 425 will be allowed to return to its innermost position, thus closing the delivery port 510, and when the next impulse of radiant energy is received, the piston 472 will be moved outwardly and the main valve will be moved through 90 degrees into the position shown in Fig. 7, in which both ends of the cylinder 330 for controlling the engine will be open to exhaust through the pipes 333, 334, and exhaust recesses 440 and 439 respectively, whereupon the piston 331 (see Fig. 3) will be permitted to be returned to a central position by the springs 376 of the cylinder 374, and the left hand rack 336 will be returned to its extreme left hand position by its spring 337 without changing the position of the corresponding crank disc 365 which will continue to hold the lever 378 in its extreme right hand position.

If now it should be desired to again act upon the propelling engine by returning the lever 378 from its extreme right hand position to its extreme left hand position, as shown in Fig. 3, the main valve 425 is again rotated into the position shown in Fig. 6, and the radiant impulse which has moved the valve into this position is again continued until the piston 331 has been again moved as hereinbefore described, into its extreme right hand position, whereupon the left hand rack 336 will again be moved to the right and the corresponding crank disc 365 again rotated through half a revolution in a counter-clockwise direction, as viewed in Fig. 3, thus returning the lever 378 to its extreme left hand position, as shown in Fig. 3. Upon the next movement of the main valve 425 into the position shown in Fig. 7, the piston 331 and its rod 332 will be permitted to be returned to a central position, as hereinbefore described, and the left hand rack 336 will be moved into its extreme left hand position by its spring 337 without affecting the corresponding crank disc 365 or the lever 378 controlled thereby.

When it is desired to control the searchlight 407, the main valve 425 is rotated in response to radiant energy, as hereinbefore described, into the position shown in Fig. 4, in which the right hand end of the cylinder 330 is connected to the main air tank 105, through the pipe 334, port 458, longitudinal recess 438, port 450, pipe 451, inner end of cylinder 471, passage 482, branch passage 481, inlet pipe 480, pipe union 102 and pipe 103; and the left hand end of the cylinder 330 is open to exhaust through the pipe 333, port 457 and longitudinal passage 441. The impulse which has moved the valve into this position is continued until the piston 331 is moved into its extreme left hand position, thus forcing the right hand rack 336 towards the left without affecting the left hand rack 336. This movement of the right hand rack 336 towards the left rotates the right hand crank disc 365 in a clockwise direction, as viewed in Fig. 3, through 180 degrees, thus swinging the lever 385 from its extreme right hand position (as shown in Figs. 2, 3, 19, 20, 21), to its extreme left hand position (not shown), thus moving the brushes 391 out of engagement with the terminals 392 and breaking the circuit through the solenoid 396, thus permitting the spring 400 to draw the rod 399 away from the solenoid 396 to close the shutters 405. When the main valve 425 is moved to its next step, and into the position shown in Fig. 5, both ends of the cylinder 330 will be open to exhaust through the pipes 333 and 334, and exhaust recesses 439 and 440, and the piston 331 will be permitted to be returned to its central position, and the right hand rack 336 will be returned to its extreme right hand position shown in Fig. 3 by its spring 337 without changing the position of the corresponding crank disc 336, which will be held stationary by the corresponding detent 371. When now it is desired to open the searchlight 407, the main valve 425 will be again rotated into the position shown in Fig. 4, and the right hand crank disc 365 will be again rotated through 180 degrees in a clockwise direction, as viewed in Fig. 3, which will cause the brushes 391 to complete the circuit through the battery 394, thus energizing the solenoid 396 and drawing in the core 398, thus opening the shutters 405. Upon the next movement of the main valve 425 through one step and into the position shown in Fig. 5, both ends of the cylinder 330 will be open to exhaust through the exhaust recesses 439 and 440, and the piston 331 will again be returned to a central position, and the right hand rack 336 will again be moved into its extreme right hand position by its spring 337, as hereinbefore described.

When it is not desired to actuate either the engine control or the searchlight control, but it is desired to rotate the main valve 425 into either one of the positions shown in Figs. 4 or 6, to permit the vessel to be automatically controlled by the gyroscope, the movement of the main valve into each of these positions is effected by comparatively short radiant impulse, which is continued only long enough to effect the movement of the valve into the required position, and not long enough to permit the air to flow through the pipe 451 and into either end of the cylinder 330, the effective area of the pipe 451 being adjustably controlled by the valve 511, whereby the effective area of the pipe may be so adjusted that the brief opening of the delivery port 510 will not affect the piston 331 which controls the propelling engine and the searchlight.

In a construction of the hereinbefore described system, the spring cylinder 140 and the parts 141, 142, 143, 144 and 67 co-operating therewith for yieldingly maintaining the rudder in a central position, and for returning the rudder to a central position after it has been moved therefrom, may be omitted without otherwise changing the system in any respect, as when the rudder is being automatically controlled by the gyroscope, the position of the rudder will be determined by the gyroscope and the part co-operating therewith, and when the rudder is being selectively controlled it may be moved as may be found necessary without the aid of the spring cylinder 140 and the co-operating parts just enumerated. However, it has been found that the spring cylinder 140 and its co-operating parts expedite the return of the rudder to a central position when it is not being otherwise controlled by the gyroscope or by the operator.

In the control of the vessel, when the main valve 425 is moved into either one of its positions shown in Figs. 4 and 6 for causing the gyroscope to automatically control the motion of the vessel, if the rudder should happen to be out of its central position, it is evident that the first action of the electrical mechanism would be to return the rudder to an approximately central position.

When it is desired to control the vessel either selectively at the will of a distant operator or automatically under the action of the gyroscope or other automatic direction maintaining means, the valve 106 is adjusted manually or otherwise so as to connect the rudder cylinder 95 with the tank 105 of compressed air thus forcing the piston 96 inwardly and disconnecting the lower segmental rudder frame 54 from the upper segmental rudder frame 70 to permit of the oscillation of the rudder without moving the upper segmental rudder frame.

When, however, it is desired to control the vessel at the will of an operator located on the vessel and through the action of the tiller rope 91, the upper frame 70 is adjusted centrally with respect to the lower frame 54, and the valve 106 is adjusted manually or otherwise to close the portion of the pipe 101 leading from the valve 106 to the air tank 105 through the pipe union 102 and pipe 103, and to open to the surrounding air the portion of the pipe 101 leading from the valve to the rudder cylinder 95, thus permitting the air to exhaust from the cylinder 95 and permitting the spring 99 to force the piston 96 outwardly to lock the upper frame 70 to the lower frame 54, and through the lower frame to the rudder post 50, whereupon the rudder may be selectively controlled through the action of the tiller rope 91 by an operator located upon the vessel.

From the foregoing description, it is evident that in this improved system all of the various devices or prime movers carried by the vessel for propelling the vessel, for controlling a searchlight or other device carried by the vessel, and for controlling the direction of movement of the vessel either automatically under the influence of the gyroscope or other direction maintaining means, or selectively at the will of a distant operator and in response to radiant energy, are controlled by the operation of the main rotary valve 425, which may be rotated in response to radiant energy or in any other suitable manner step by step into a plurality of predetermined positions (in the form shown into four positions), in each of which the valve may be caused to effect the performance of a plurality of functions, by effecting the actuation of a plurality of prime movers.

In order to effect the actuation of all of the plurality of prime movers corresponding to any one of the predetermined positions of the main valve 425, it is necessary to permit the main valve to remain in that position for a predetermined appreciable time sufficient for that purpose, and in some positions of the main valve it is also necessary, as hereinbefore described, to prolong the impulse of radiant energy or other form of energy which has caused the valve to be moved into that position for an appreciable and predetermined period of time after the actuation of one or more of the corresponding prime movers has been effected in order to effect the actuation of another one of the corresponding prime movers. The amount of time it is necessary to leave the valve 425 in any particular position and the amount of time it is necessary to prolong the impulse of radiant energy or other energy, which has caused the valve 425 to be moved into any particular position, in order to effect the actuation of any one or more of the corresponding prime movers depends upon and may be varied by changing the lengths and diameters of the various ports, pipes, cylinders, etc. through which the compressed air must pass in any particular case, and in some cases depends upon and might be varied by changing the adjustment of the retarding valve 511 (or other similar retarding valves which might be arranged to control each of the various pipes).

The construction is preferably such that when the main valve is in any given position, the actuation of the corresponding prime movers may be effected in the order hereinbefore described, in other words, after the valve has been rotated into any one of its various positions, if it is permitted to remain in that position for a sufficient period, the clutching mechanism between the gyroscopic stem 175 and the commutator 195 will first be effected either to connect the gyroscopic stem to the commutator or to disconnect the gyroscopic stem from the commutator as the case may be, and preferably only after this result has been produced will the main valve be effective to cause the performance of any one of the other functions of steering the vessel either automatically in a predetermined direction, or selectively in either direction, or of controlling either the propelling engine or the searchlight or other device or devices located on the vessel under the control of the main valve. From the foregoing it is also evident that the main valve 425 may be rotated so quickly through its various positions as to have practically no appreciable effect upon the various devices controlled thereby.

Although only a single form has been shown in which this invention may be embodied, it is to be understood that the invention is not limited to the specific construction shown, but might be embodied in various systems and devices and for various purposes without departing from the spirit of the invention or the scope of the appended claims.

Having thus fully described this invention, I claim and desire to protect by Letters Patent of the United States:—

1. The combination with a movable body, of a plurality of operative devices carried thereby, and means for actuating said devices in response to impulses of energy received from a distance, an impulse of energy of predetermined duration being effective to cause the actuation of one of said devices, and an impulse of a different duration being effective to actuate said device and also another of said devices.

2. The combination with a movable body, of a plurality of operative devices carried thereby, and means for actuating said devices in response to impulses of energy received from a distance, an impulse of energy of predetermined duration being effective to cause the actuation of one of said devices, and an impulse of a longer duration being effective to actuate said device and also another of said devices.

3. The combination with a movable body, of a plurality of operative devices carried thereby, and means for actuating said devices in response to impulses of energy received from a distance, an impulse of energy of predetermined duration being effective to cause the actuation of one of said devices only, and an impulse of energy of a different duration being effective to actuate said device and also another of said devices.

4. The combination with a movable body, of a plurality of operative devices carried thereby, and means for actuating said devices in response to impulses of energy received from a distance, an impulse of energy of predetermined duration being effective to cause the actuation of one of said devices only, and an impulse of energy of a different duration being effective to actuate said device and also another of said devices following the actuation of said first mentioned device.

5. The combination with a movable body, of a plurality of operative devices carried thereby, and means carried by said body for controlling said devices in response to impulses of energy, said controlling means being arranged to control one of said devices in response to an impulse of a given duration and to control another of said devices only in response to an impulse of a different duration.

6. The combination with a movable body, of a plurality of operative devices carried thereby, and means carried by said body for controlling said devices in response to impulses of radiant energy, said controlling means being arranged to control one of said devices in response to an impulse of a given duration and to control another of said devices only in response to an impulse of a different duration.

7. The combination with a movable body, of a plurality of operative devices carried thereby, and means carried by said body for controlling said devices in response to impulses of radiant energy, said controlling means being arranged to control one of said devices in response to an impulse of a predetermined duration and to control said device and also another of said devices only in response to an impulse of a different duration.

8. The combination with a movable body, of a plurality of operative devices carried thereby, and means carried by said body for controlling said devices in response to impulses of radiant energy, said controlling means being arranged to control one of said devices in response to an impulse of a predetermined duration and to control said device and also another of said devices only in response to an impulse of a longer duration.

9. The combination with a movable body, of means carried thereby and operative to control the direction of movement of said body, an operative device carried by said body, controlling means for said first mentioned means and said device including a movable member, and means for actuating said movable member in response to impulses of energy received from a distance, said actuating means being effective, when said movable member is in a given position, either to control said first mentioned means or to control said first mentioned means and also said device.

10. The combination with a movable body, of means carried thereby and operative to control the direction of movement of said body, an operative device carried by said body, controlling means for said first mentioned means and said device including a movable member, and means for actuating said movable member in response to impulses of radiant energy received from a distance, said actuating means being effective, when said movable member is in a given position, either to control said first mentioned means or to control said first mentioned means and also said device.

11. The combination with a movable body, of means carried thereby and operative to control the direction of movement of said body, an operative device carried by said body, controlling means for said first mentioned means and said device including a movable member, and means for actuating said movable member in response to impulses of energy received from a distance, said actuating means being effective, when said movable member is in a given position, either to control said first mentioned means or to control said first mentioned means and also said device, the control in either case being dependent upon the duration of one of said impulses.

12. The combination with a movable body, of means carried thereby and operative to control the direction of movement of said body, an operative device carried by said body, controlling means for said first mentioned means and said device including a movable member, and means for actuating said movable member in response to impulses of energy received from a distance, said actuating means being effective, when said movable member is in a given position, either to control said first mentioned means or to control said first mentioned means and also said device, the control in either case being dependent upon the duration of the impulse which has moved the said member into the said position.

13. The combination with a movable body, of means carried thereby and operative to control the direction of movement of said body, an operative device carried by said body, controlling means for said first mentioned means and said device including a movable member, and means for actuating said movable member in response to impulses of radiant energy received from a distance, said actuating means being effective, when said movable member is in a given position, either to control said first mentioned means or to control said first mentioned means and also said device, the control in either case being dependent upon the duration of one of said impulses.

14. The combination with a movable body, of means carried thereby and operative to control the direction of movement of said body, an operative device carried by said body, controlling means for said first mentioned means and said device including a movable member, and means for actuating said movable member in response to impulses of radiant energy received from a distance, said actuating means being effective, when said movable member is in a given position, either to control said first mentioned means or to control said first mentioned means and also said device, the control in either case being dependent upon the duration of the impulse which has moved the said member into the said position.

15. The combination with a movable body, of means carried thereby and operative to control the direction of movement of said body, an operative device carried by said body, controlling means for said first mentioned means and said device including a rotary member, and means for rotating said rotary member in response to impulses of energy received from a distance.

16. The combination with a movable body, of means carried thereby and operative to control the direction of movement of said body, an operative device carried by said body, controlling means for said first mentioned means and said device including a rotary member, and means for rotating said rotary member in response to impulses of radiant energy received from a distance.

17. The combination with a movable body, of means carried thereby and operative to control the direction of movement of said body, an operative device carried by said body, controlling means for said first mentioned means and said device including movable fluid distributing means, and means for actuating said distributing means in response to impulses of energy received from a distance, said actuating means being effective, when said distributing means is suitably positioned, either to control said first mentioned means or to control said first mentioned means and also said device, dependent upon the duration of one of said impulses in either case.

18. The combination with a movable body, of means carried thereby and operative to control the direction of movement of said body, an operative device carried by said body, controlling means for said first mentioned means and said device including a rotary valve arranged to distribute fluid under pressure, and actuating means for giving said valve a step-by-step rotary movement in response to impulses of radiant energy, an impulse of energy of a predetermined duration being effective to move said valve through one step and to cause the actuation of said first mentioned means independently of said device, and an impulse of longer duration being effective to move said valve through said step and to consecutively cause the actuation of said first mentioned means and said device.

19. The combination with a movable body, of means carried thereby including an element relatively rotatable with respect to said body about a given axis but arranged to be held against rotation in space about said axis regardless of the movement of said body to control the direction of movement of said body, an operative device carried by said body, controlling means for said first mentioned means and said device including a movable member, and means for actuating said movable member in response to impulses of energy received from a distance, said actuating means being effective to actuate said first mentioned means in response to an impulse of energy of predetermined duration and to successively actuate said first mentioned means and said device only in response to an impulse of energy of a longer duration.

20. The combination with a movable body, of means carried thereby including a gyroscope operative to control the direction of movement of said body, an operative device carried by said body, controlling means for said first mentioned means and said device including a movable member, and means for actuating said movable member in response to impulses of energy received from a distance, said actuating means being effective to actuate said first mentioned means in response to an impulse of energy of predetermined duration and to successively actuate said first mentioned means and said device only in response to an impulse of energy of a longer duration.

21. The combination with a movable body, of means automatically operative to stabilize said body with respect to a given axis, an operative device carried by said body, and controlling means for said first mentioned means and said device, said controlling means being responsive to an impulse of energy of a predetermined duration to actuate said first mentioned means independently of said device, and being responsive to an impulse of longer duration to successively actuate said first mentioned means and said device.

22. The combination with a movable body, of means carried thereby and operative to control the direction of movement of said body, an operative device carried by said body, and means responsive to an impulse of energy of predetermined duration to actuate said first mentioned means independently of said device, and responsive to an impulse of energy of longer duration to successively actuate said first mentioned means and said device.

23. The combination with a movable body, of means carried thereby and automatically operative to control the direction of movement of said body, an operative device carried by said body, and means responsive to an impulse of energy of predetermined duration to actuate said first mentioned means independently of said device, and responsive to an impulse of energy of longer duration to successively actuate said first mentioned means and said device.

24. The combination with a movable body, a plurality of operative devices carried thereby, and means responsive to an impulse of energy of predetermined duration to actuate one of said devices independently of another of said devices, and responsive to an impulse of longer duration to actuate said two last named devices successively.

25. The combination with a movable body, of means carried thereby and operative to steer said body in a predetermined direction, an operative device carried by said body, means operative independently of said device and responsive to an impulse of energy of predetermined duration to modify the action of said steering means, and responsive to an impulse of longer duration to successively modify the action of said steering means and to actuate said device.

26. The combination with a movble body, of means carried thereby and automatically operative to steer said body in a predetermined direction, an operative device carried by said body, means operative independently of said device and responsive to an impulse of energy of predetermined duration to modify the action of said steering means, and responsive to an impulse of longer duration to successively modify the action of said steering means and to actuate said device.

27. The combination with a movable body, of means carried thereby and automatically operative to cause said body to move in a predetermined direction, an operative device carried by said body, and controlling means responsive to an impulse of energy of predetermined duration to modify the action of said direction-controlling means independently of said device, and responsive to an impulse of longer duration to successively modify the action of said direction-controlling means and to actuate said device, said last mentioned controlling means being also operative in response to an impulse of energy to modify the action of said first mentioned means and to steer said body away from said direction.

28. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis.

29. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis to any desired extent.

30. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis either in one direction or in an opposite direction.

31. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis either in one direction or in an opposite direction, and to any desired extent in either direction.

32. The combination with a movable body, of means including a gyroscope carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis.

33. The combination with a movable body, of means including a gyroscope carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis to any desired extent.

34. The combination with a movable body, of means including a gyroscope carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis either in one direction or in an opposite direction.

35. The combination with a movable body, of means including a gyroscope carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to rotate said body about said axis either in one direction or in an opposite direction, and to any desired extent in either direction.

36. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to actuate said device, said controlling means being also operable independently of said device in response to an impulse of energy to modify the action of said first mentioned means and to rotate said body about said axis.

37. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to actuate said device, said controlling means being also operable independently of said device in response to an impulse of energy to overcome the action of said first mentioned means and to rotate said body about said axis.

38. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to actuate said device, said controlling means being also operable independently of said device in response to an impulse of energy to terminate the action of said first mentioned means and to rotate said body about said axis.

39. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to actuate said device, said controlling means being also operable independently of said device in response to an impulse of energy to modify the action of said first mentioned means and to rotate said body about said axis in either direction.

40. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to actuate said device, said controlling means being also operable independently of said device in response to an impulse of energy to overcome the action of said first mentioned means and to rotate said body about said axis to any desired extent.

41. The combination with a movable body, of means carried thereby and automatically operative to stabilize said body with respect to a given axis, an operative device carried by said body, and controlling means operable independently of said device in response to an impulse of predetermined duration to modify the action of said first mentioned means, and operable in response to an impulse of longer duration to consecutively modify the action of said first mentioned means and to actuate said device, said controlling means being also operable independently of said device in response to an impulse of energy to terminate the action of said first mentioned means and to rotate said body about said axis in either direction and to any desired extent in either direction.

42. The combination with a movable body, of means automatically operative to control the direction of movement of said body, and means to limit the automatic effect of said first mentioned means upon said body including two brushes arranged to move in unison, a pair of spaced contacts arranged to be alternately engaged by one of said brushes, a third contact arranged to be engaged by the other of said brushes when said first mentioned brush is between said first mentioned contacts, and to be lifted from said third contact when said first mentioned brush is in contact with either of said first mentioned contacts, and a pair of spaced contacts electrically connected at all times to said brushes respectively.

43. The combination with a movable body, of means automatically operative to stabilize said body with respect to a given axis, and means to limit the automatic effect of said stabilizing means upon said body including two brushes arranged to move in unison, a pair of spaced contacts arranged to be alternately engaged by one of said brushes, a third contact arranged to be engaged by the other of said brushes when said first mentioned brush is between said first mentioned contacts, and to be lifted from said third contact when said first mentioned brush is in contact with either of said first mentioned contacts, and a pair of spaced contacts electrically connected at all times to said brushes respectively.

44. The combination with a movable body, of automatic means carried thereby including an element arranged to oscillate with respect to said body for maintaining said body upon a predetermined course, and means for limiting the automatic action of said first mentioned means upon said element including a pair of brushes arranged to move in unison with respect to said body and actuated by said element, a pair of spaced contacts arranged to be alternately engaged by one of said brushes, a third contact arranged to be engaged by the other of said brushes when said first mentioned brush is between said first mentioned contacts, and to be lifted from said third contact when said first mentioned brush is in contact with either of said first mentioned contacts, and a pair of spaced contacts electrically connected at all times to said brushes respectively.

45. The combination with a movable body, of automatic means carried thereby including a rudder arranged to oscillate with respect to said body for maintaining said body upon a predetermined course, and means for limiting the automatic action of said first mentioned means upon said rudder including a pair of brushes arranged to move in unison with respect to said body and actuated by said rudder, a pair of spaced contacts arranged to be alternately engaged by one of said brushes, a third contact arranged to be engaged by the other of said brushes when said first mentioned brush is between said first mentioned contacts, and to be lifted from said third contact when said first mentioned brush is in contact with either of said first mentioned contacts, and a pair of spaced contacts electrically connected at all times to said brushes respectively.

46. The combination with a movable body, of means carried thereby and operative to maintain said body upon a predetermined course, a plurality of operative devices carried by said body, controlling means carried by said body for said first mentioned means and said devices, responsive to impulses of energy to actuate said first mentioned means independently of any of said devices and to actuate any one of said devices independently of the remaining devices.

47. The combination with a movable body, of means carried thereby and automatically operative to maintain said body upon a predetermined course, a plurality of operative devices carried by said body, controlling means carried by said body for said first mentioned means and said devices, responsive to impulses of energy to actuate said first mentioned means independently of any of said devices and to actuate any one of said devices independently of the remaining devices.

48. The combination with a movable body, of means carried thereby and operative to maintain said body upon a predetermined course, a plurality of operative devices carried by said body, and controlling means for said first mentioned means and said devices responsive to an impulse of energy of predetermined duration to control said first mentioned means independently of any of said devices, and operable in response to impulses of longer duration to consecutively control said first mentioned means and any one of said devices independently of the remaining of said devices.

49. The combination with a movable body, of means carried thereby and automatically operative to maintain said body upon a predetermined course, means for changing the rate of movement of said body, a searchlight on said body, and controlling means operative independently of said second mentioned means and said searchlight to modify the action of said first mentioned means and to steer said body away from said course, and operative to initiate the automatic action of said first mentioned means and control either said second mentioned means or said searchlight selectively.

50. The combination with a movable body, of means carried thereby and automatically operative to maintain said body upon a predetermined course, means for changing the rate of movement of said body, a searchlight on said body, and controlling means operative independently of said second mentioned means and said searchlight to modify the action of said first mentioned means and to steer said body away from said course, and operative to successively initiate the automatic action of said first mentioned means and control either said second mentioned means or said searchlight selectively.

51. The combination with a movable body, of a plurality of operative devices carried thereby, and means for actuating said devices in response to impulses of radiant energy, said means being so arranged that an impulse of radiant energy of predetermined duration will be effective to cause the actuation of one of said devices, and an impulse of radiant energy of a different duration will be effective to actuate said device and also another of said devices.

52. The combination with a movable body, of a plurality of operative devices carried thereby, and means for actuating said devices in response to impulses of radiant energy, said means being arranged so that an impulse of radiant energy of predetermined duration will be effective to cause the actuation of one of said devices, and an impulse of radiant energy of a longer duration will be effective to cause the actuation of said device and another of said devices.

53. The combination with a plurality of operative devices, of means for actuating said devices in response to impulses of radiant energy, said means being arranged so that an impulse of radiant energy of predetermined duration will be effective to cause the actuation of one of said devices, and an impulse of radiant energy of a different duration will be effective to cause the actuation of said device and also another of said devices.

54. The combination with a plurality of operative devices, of means for actuating said devices in response to impulses of electroradiant energy, said means being so arranged that an impulse of electroradiant energy of predetermined duration will be effective to cause the actuation of one of said devices, and so that an impulse of electroradiant energy of a different duration will be effective to cause the actuation of said device and also another of said devices.

55. The combination with a movable body, of means carried thereby for steering said body, means carried thereby for propelling said body, a source of light mounted on said body, an element responsive to radiant energy carried by said body, and means controlled by said element for controlling said steering means, said propelling means and said source of light.

56. The combination with a movable body, of means carried thereby for steering said body, means carried thereby for propelling said body, a searchlight mounted on said body, an element responsive to radiant energy carried by said body, and means controlled by said element for controlling said steering means, said propelling means and said searchlight.

57. The combination with a movable body, of means carried thereby for steering said body, stabilizing means carried by said body and arranged to automatically control said steering means, means carried by said body for propelling the same, a source of light carried by said body, an element responsive to radiant energy, and means controlled by said element for controlling said steering means, said stabilizing means, said propelling means and said source of light.

58. The combination with a movable body, of means carried thereby for steering said body, means carried thereby for propelling said body, a source of light mounted on said body, an element responsive to electro-radiant energy carried by said body, and means controlled by said element for controlling said steering means, said propelling means and said source of light.

59. The combination with a movable body, of means carried thereby for steering said body, means carried thereby for propelling said body, a searchlight mounted on said body, an element responsive to electro-radiant energy carried by said body, and means controlled by said element for controlling said steering means, said propelling means and said searchlight.

60. The combination with a movable body, of means carried thereby for steering said body, stabilizing means carried by said body and arranged to automatically control said steering means, means carried by said body for propelling the same, a source of light carried by said body, an element responsive to electro-radiant energy, and means controlled by said element for controlling said steering means, said stabilizing means, said propelling means and said source of light.

61. The combination with a movable body, of means carried thereby for steering said body, means carried thereby for propelling said body, a source of light mounted on said body, an element responsive to radiant energy carried by said body, and a fluid-distributing valve controlled by said element for controlling said steering means, said propelling means and said source of light.

62. The combination with a movable body, of means carried thereby for steering said body, means carried thereby for propelling said body, a searchlight mounted on said body, an element responsive to radiant energy carried by said body, and a fluid-distributing valve controlled by said element for controlling said steering means, said propelling means and said searchlight.

63. The combination with a movable body, of means carried thereby for steering said body, stabilizing means carried by said body and arranged to automatically control said steering means, means carried by said body for propelling the same, a source of light carried by said body, an element responsive to radiant energy, and a fluid-distributing valve controlled by said element for controlling said steering means, said stabilizing means, said propelling means and said source of light.

64. The combination with a searchlight, of a motor, means responsive to radiant energy and arranged to control said searchlight and said motor selectively.

65. The combination with a source of light, of a motor, and an element arranged to reciprocate in a fixed path and operative to control said source of light and said motor selectively.

66. The combination with a source of light, of a prime mover, a fluid-actuated element arranged to control said source of light and said prime mover selectively, and means responsive to radiant energy for controlling said element.

67. The combination with a source of light, of a prime mover, a fluid-actuated element arranged to reciprocate in a fixed path to control said source and said prime mover selectively, yielding means normally operative to hold said element in a predetermined position and to return said element to said position when said element is displaced in either direction longitudinally from said position, and means responsive to radiant energy to move said element selectively in either direction from said position.

Signed at New York city, in the county of New York and State of New York, this tenth day of December, A. D., 1915.

JOHN HAYS HAMMOND, Jr.

Witnesses:
ALBERT D. TREVOR,
A. I. GARDNER.